United States Patent [19]
Beck et al.

[11] 3,993,891
[45] Nov. 23, 1976

[54] HIGH SPEED PARALLEL DIGITAL ADDER EMPLOYING CONDITIONAL AND LOOK-AHEAD APPROACHES

[75] Inventors: Gary Randall Beck, El Toro; Ronald Carlos Quave, Mission Viejo, both of Calif.

[73] Assignee: Burroughs Corporation, Detroit, Mich.

[22] Filed: July 3, 1975

[21] Appl. No.: 593,167

[52] U.S. Cl. .............................................. 235/175
[51] Int. Cl.² ........................................ G06F 7/50
[58] Field of Search .................................... 235/175

[56] References Cited
UNITED STATES PATENTS

| | | | |
|---|---|---|---|
| 3,316,393 | 4/1967 | Ruthazer | 235/175 |
| 3,566,098 | 2/1971 | Kono | 235/175 |
| 3,697,735 | 10/1972 | Hanson | 235/175 |
| 3,700,875 | 10/1972 | Saenger et al. | 235/175 |
| 3,805,045 | 4/1974 | Larsen | 235/175 |

*Primary Examiner*—David H. Malzahn
*Attorney, Agent, or Firm*—Nathan Cass; Kevin R. Peterson

[57] ABSTRACT

A high speed parallel digital adder/subtracter employing a specially chosen combination of "conditional" and "look-ahead" approaches which permits economically achieving high speed operation even for input operands containing relatively large numbers of digits. In a preferred embodiment, simultaneously produced look-ahead carry and carry-not signals are generated and employed to select particular ones of simultaneously generated conditional sums for one or more operand digits so as to simultaneously provide resulting digital sums which properly represent the sum of the input operands.

18 Claims, 7 Drawing Figures

$$S_n^0 = X_n + Y_n$$
$$S_n' = X_n + Y_n + 1$$
$$P_n = (ADD)(X_n \oplus Y_n) + (SUBTRACT)(\overline{X_n} \cdot \overline{Y_n} + X_n \cdot Y_n)$$
$$G_n = (ADD)(X_n \cdot Y_n) + (SUBTRACT)(\overline{X_n} \cdot \overline{Y_n})$$
$$A_n = (ADD)(\overline{X_n} \cdot \overline{Y_n}) + (SUBTRACT)(X_n \cdot \overline{Y_n})$$
$$n = 0, 1, 2, 3$$

ADD/SUBTRACT CONTROL

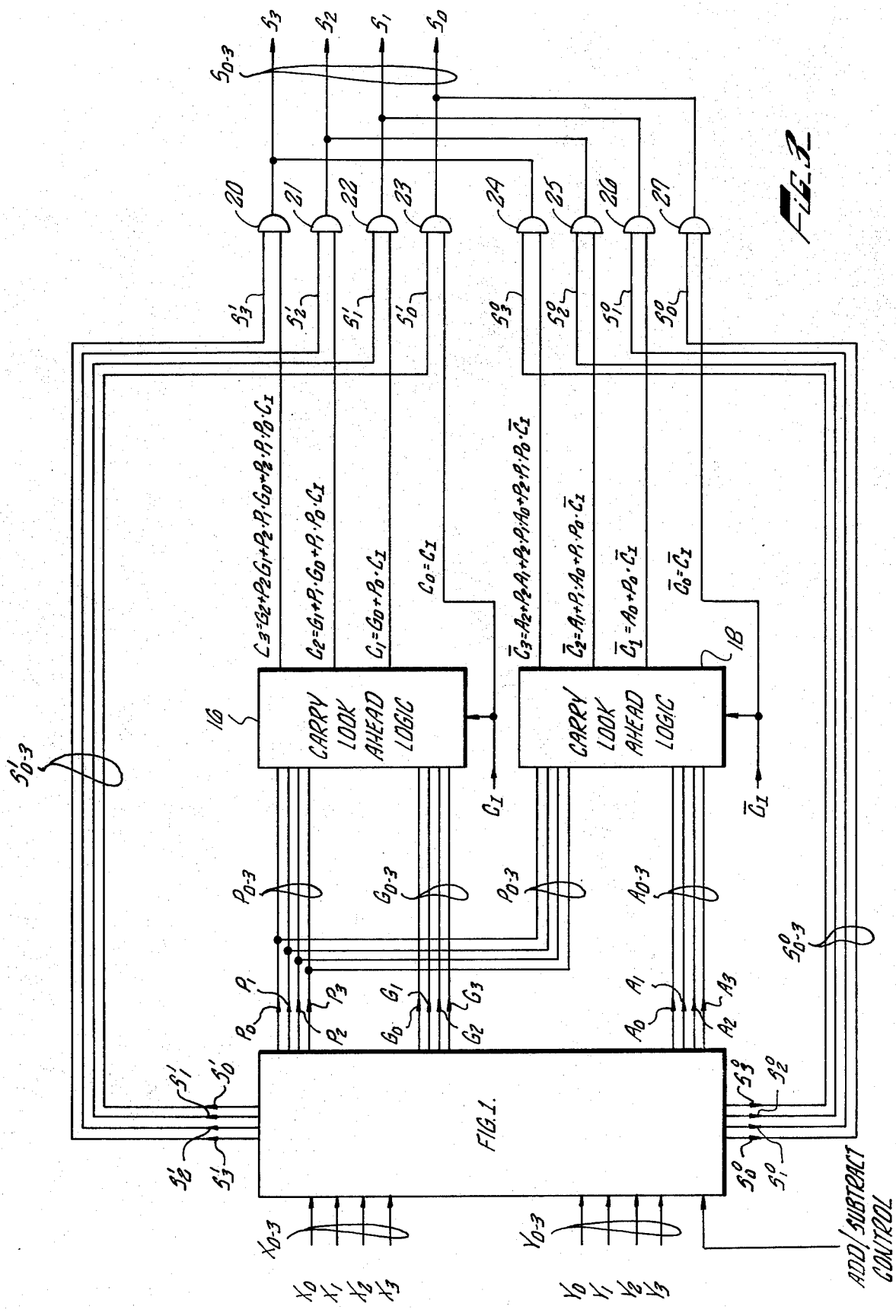

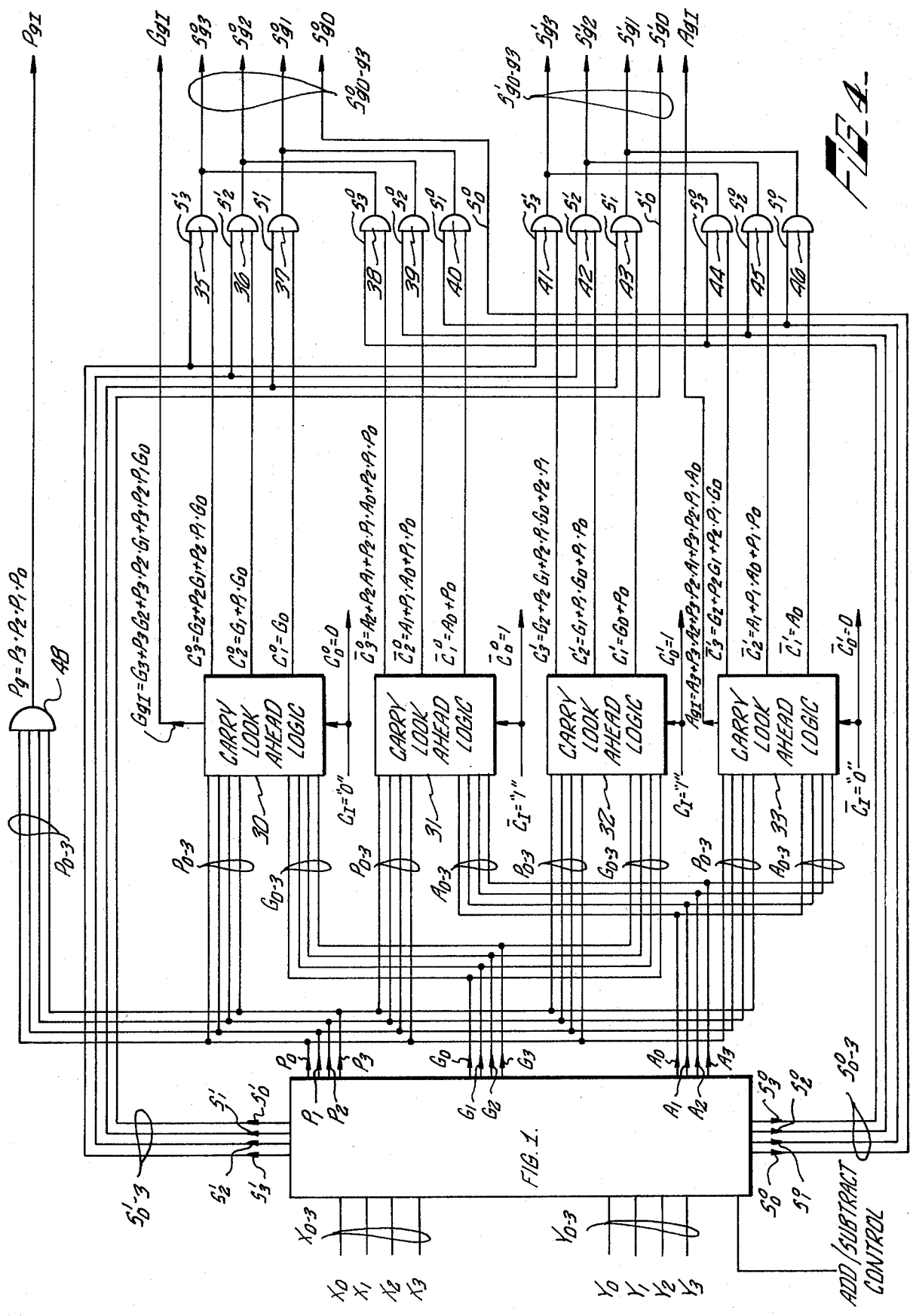

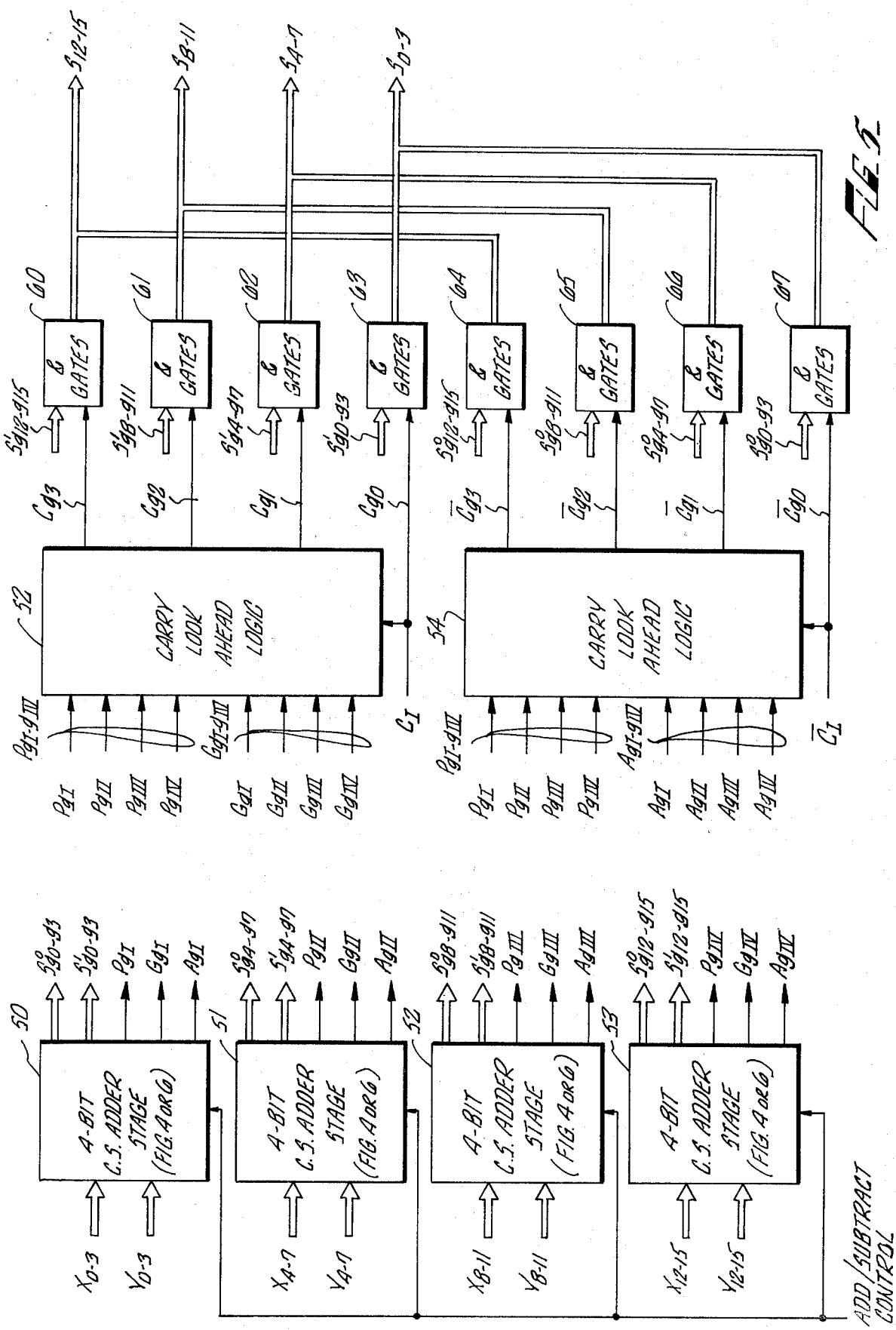

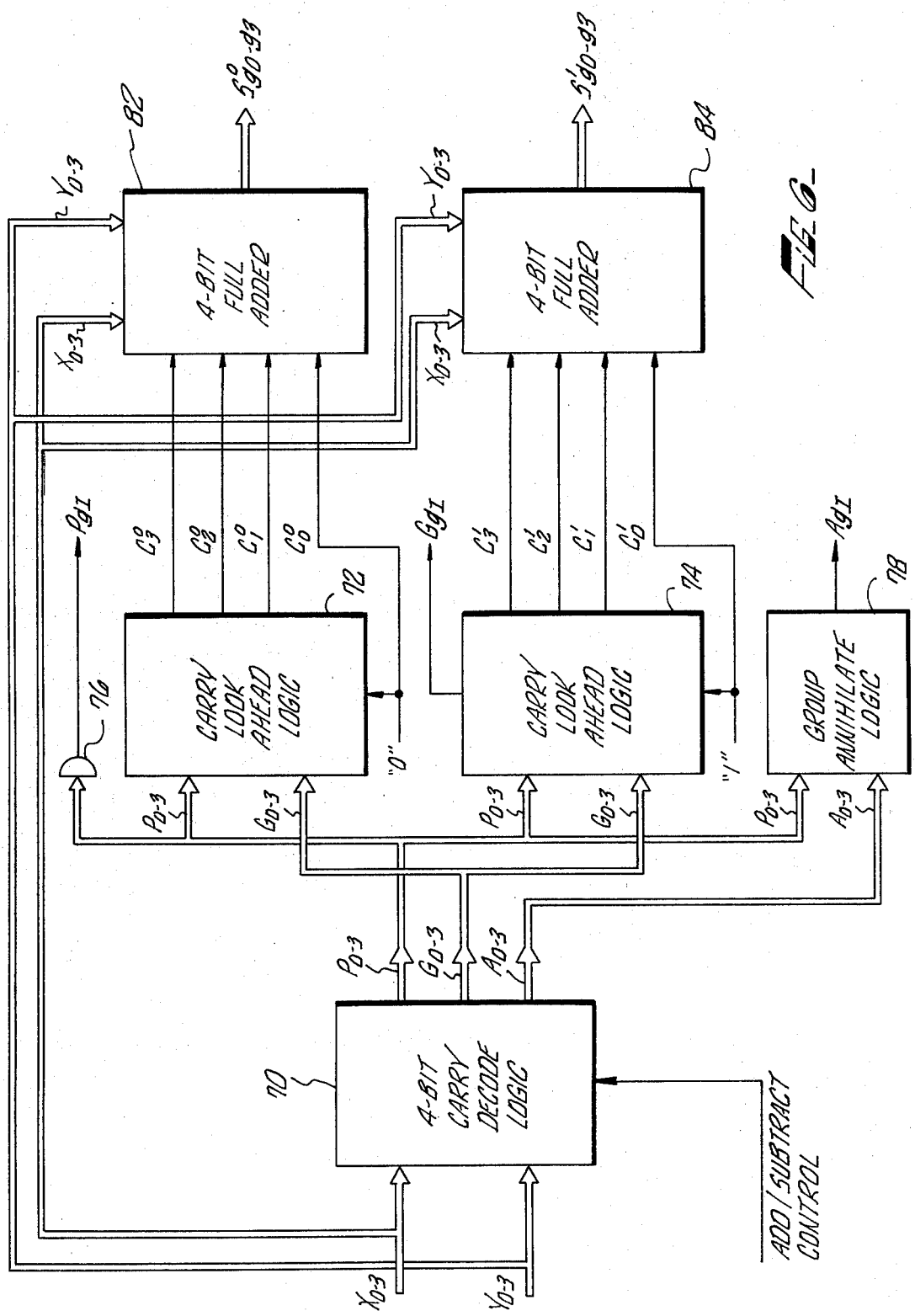

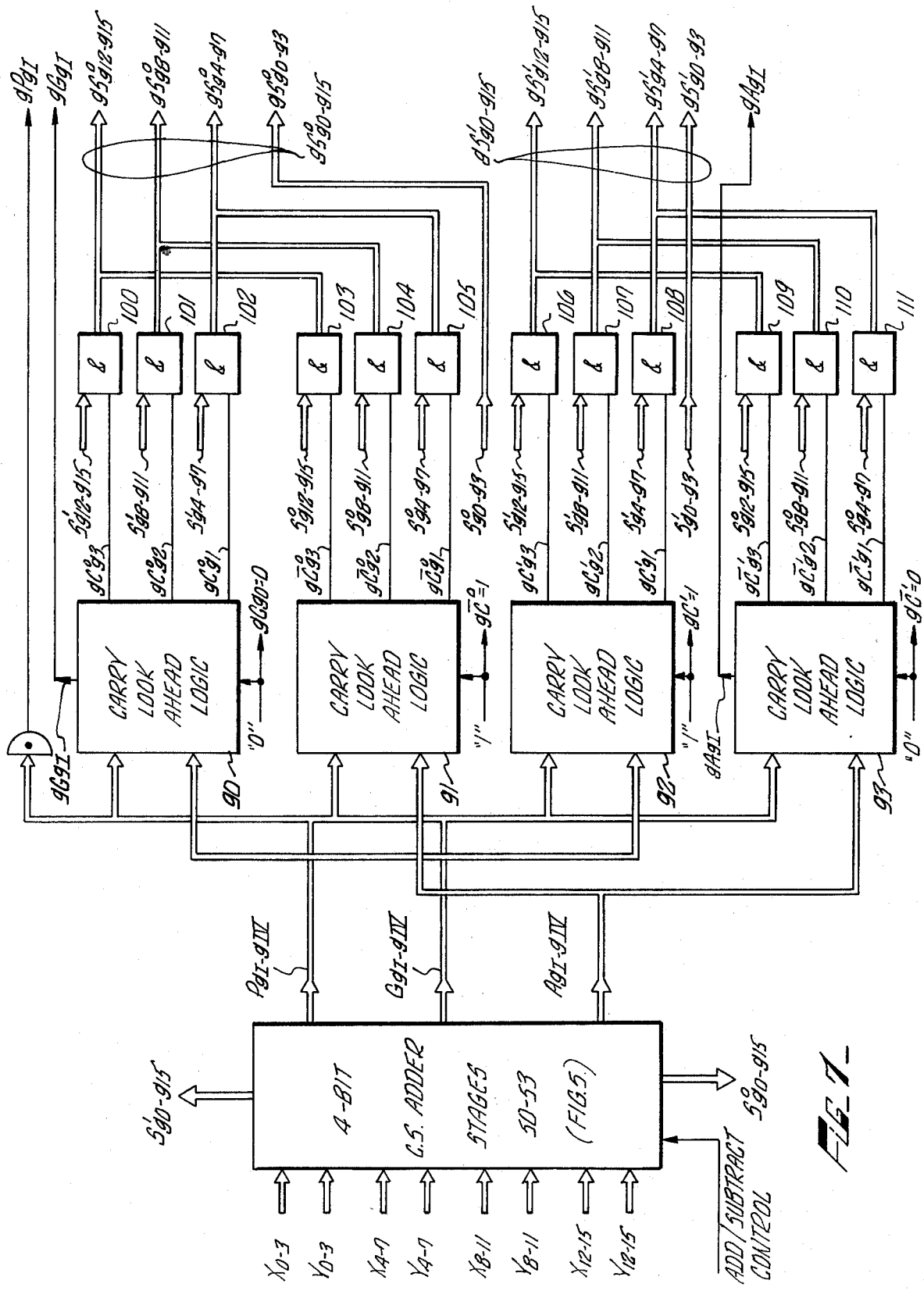

HIGH SPEED PARALLEL DIGITAL ADDER EMPLOYING CONDITIONAL AND LOOK-AHEAD APPROACHES

BACKGROUND OF THE INVENTION

This invention relates generally to means and methods for performing arithmetic operations in a data processor. More particularly, this invention relates to improved means and methods for providing high speed parallel addition and/or subtraction in a digital data processor.

In parallel type digital adders and subtractors, all orders of digits of the two digital operands (which are the addend and augend in the case of addition, or the subtrahend and minuend in the case of subtraction) are applied in parallel to the input, and all digits of the resulting sum or difference are provided in parallel at the output. In such parallel adders or subtractors, provision must, of course, be made for providing the carry or borrow information required for obtaining the correct sum or difference. One approach for providing the required carry and borrow information employs what is known as "propagate" logic in which the carry or borrow information generated in the lowest order position ripples through to the highest order position. However, such propagation takes time and the resulting delays are accumulative, thus a relatively long time may be required for the overall addition or subtraction operation which may be unduly long for many types of applications requiring high speed.

In order to achieve faster operation, a second approach to the design of parallel adders and subtractors has been employed utilizing what is known as "look-ahead" logic which generates the required carry or borrow information in parallel for all orders. Although this look-ahead approach achieves much faster operation than does the propagate approach mentioned above, it has the significant disadvantage of requiring complex logic circuit arrangements which continue to increase in complexity as the number of digits of the operands increases.

A third approach to the design of parallel adders and subtractors utilizes what is known as "conditional" logic in which two conditional results are generated for each order, one assuming the presence of an input carry or borrow, and the other assuming the absence of an input carry or borrow. Selection of the conditional sums is then made based on carry or borrow information derived from lower orders. This conditional approach represents another way of achieving higher speed operation, but also suffers from the disadvantage of requiring increasingly complex logic circuitry as the number of operand digits is increased.

SUMMARY OF THE INVENTION

The present invention is directed to improved means and methods for providing high speed, parallel digital addition and subtraction by utilizing a novel combination of conditional and look-ahead approaches in a manner which permits achieving high speed operation without requiring excessive circuit complexity even for operands containing relatively large numbers of digits.

In a preferred embodiment of a basic form of combined conditional and look-ahead high speed adder in accordance with the invention, the addend and augend are applied in parallel to a first level of logic comprising a plurality of conditional sum adder stages, each stage receiving a different one or more corresponding pairs of digits of the addend and augend. Each conditional sum adder stage operates to produce two conditional sums along with carry propagate, carry generate and carry annihilate information for the stage based on the addend and augend digits applied thereto without requiring any carry or other information from any other stage. One conditional sum of each stage is the result obtained assuming a carry-in to the stage, while the other conditional sum is obtained assuming that no carry-in is present.

The carry propagate, carry generate and carry annihilate information provided by each of the conditional sum adder stages, as described above, are applied to carry look-ahead logic for simultaneously producing a look-ahead signal and a look-ahead carry-not signal for each stage. These look-ahead carry and carry-not signals are then applied to selection AND gates along with respective ones of the conditional sums for selecting the particular one of the conditional sums of each stage which is to be used as the corresponding output digit of the sum of the applied addend and augend.

Further, in accordance with the invention, means, and methods are provided for extending the basic combined conditional and look-ahead approach of the invention to provide for economically handling input operands having relatively large numbers of bits.

BRIEF DESCRIPTION OF THE DRAWINGS

The specific nature of the invention as well as other objects, features, advantages and uses thereof will become evident from the following detailed description of preferred embodiments of the invention taken in conjunction with the accompanying drawings, wherein:

FIG. 3 is an electrical block diagram including pertinent logical equations illustrating how the first level of logic of FIG. 1 may be employed in conjunction with carry look-ahead and conditional selection logic to provide a high speed 4-bit conditional sum adder in accordance with the invention.

FIG. 4 is an electricial block diagram including pertinent logical equations illustrating how the first level of logic of FIG. 1 may be employed in conjunction with look-ahead and conditional selection logic to provide a 4-bit conditional sum adder stage which may be combined with other like stages for providing a larger size high speed adder in accordance with the invention.

FIG. 5 is an electrical block diagram illustrating how a plurality of 4-bit conditional sum adder stages, such as illustrated in either FIG. 4 or FIG. 6 can be combined to provide a high speed 16-bit adder in accordance with the invention.

FIG. 6 is an electrical block diagram illustrating an alternative embodiment to that of FIG. 4 for providing a 4-bit conditional sum adder stage.

FIG. 7 is an electrical block diagram illustrating how the combined conditional and look-ahead approach of the invention may be extended in modular fashion to provide a 16-bit conditional sum adder stage which may be combined with other like stages for providing a high speed adder capable of handling operands having relatively large numbers of operand bits.

DETAILED DESCRIPTION OF THE DRAWINGS

Figures 1, 2:
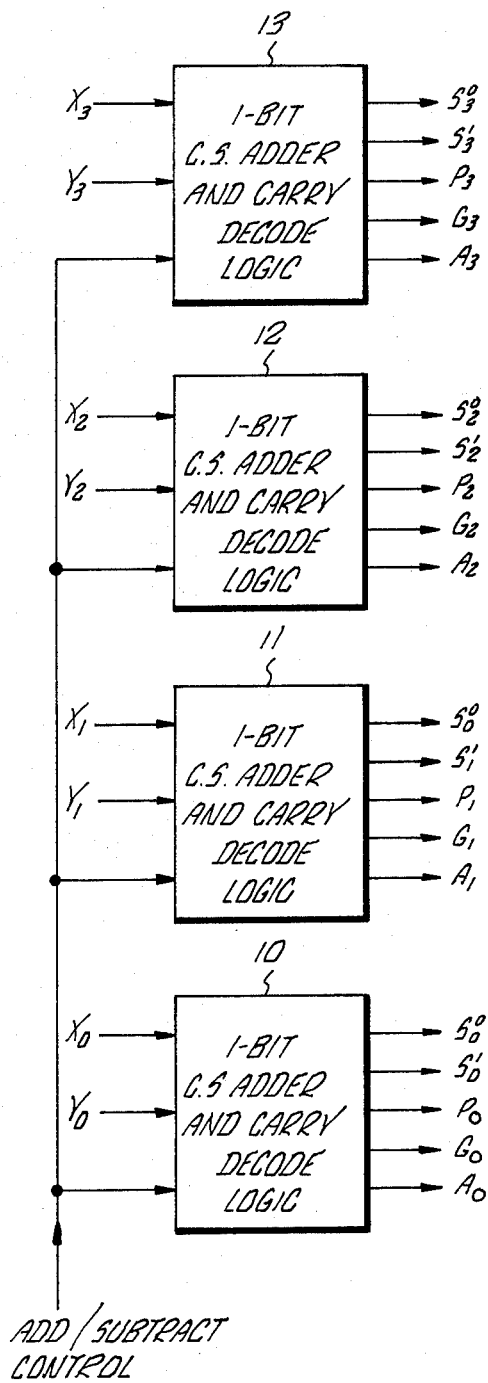
FIG. 1 is an electrical block diagram illustrating a first level of logic for providing conditional sums and carry propagate, generate and annihilate signals for use in a preferred embodiment of a high speed adder/subtractor in accordance with the invention.
FIG. 2 is a series of logical equations for the first level of logic of FIG. 1 defining the logical relationships between the binary digits of the input operands, the conditional sums, and the output carry propagate, generate and annihilate signals.

Like characters and numerals refer to like elements throughout the figures of the drawings.

Referring initially to FIG. 1, illustrated therein are four like 4-bit adder stages 10, 11, 12, and 13, each of which has applied thereto a respective pair of the bits $X_0, Y_0, X_1, Y_1, X_2, Y_2$ and $X_3, Y_3$ of the input operands X and Y. For purposes of addition, these operands X and Y are conventionally referred to as the addend and augend, respectively, while for subtraction they are conventionally referred to as the subtrahend and minuend, respectively. As indicated in FIG. 1, each of the 1-bit conditional sum adder and carry logic circuits 10–13 includes logic circuitry, which may be of conventional form, for producing the following output signals in response to the respective X and Y bits applied thereto: Two conditional outputs $S_n°$ and $S_n'$ (where the subscript $n = 0, 1, 2$ and 3 corresponding to the bit position of the respective pair of applied operand bits), a carry propagate output $P_n$, a carry generate output $G_n$ and a carry annihilate output $A_n$, the applicable logical equation for each of these outputs being given in FIG. 2. As is conventional, the presence of a "bar" over a term is used to indicate the logical "inverse" of the term. A "°" or "'" superscript is used to indicate whether a particular signal is derived assuming a "°" carry-in or a "'" carry-in.

Each of the 1-bit conditional sum adder and carry decode logic circuits 10–13 in FIG. 1 also includes an additional input for receiving a binary ADD/SUBTRACT control signal for determining whether the logic of each of the circuits 10–13 is to perform in accordance with an add or a subtract operation. As is well known, and as will be evident from the logical equations of FIG. 2, the logic of the $P_n$, $G_n$, and $A_n$ terms will differ depending upon whether an addition or subtraction is to be performed, while the $S_n°$ and $S_n'$ outputs will be the same for both addition and subtraction. Thus, it will be understood that, for addition, $S_n°$ represents the sum of the respective applied pair of operand bits $X_n$ and $Y_n$ assuming the absence of a carry-in (that is, a carry-in of 0), while $S_n'$ represents the sum assuming the presence of a carry-in (that is, a carry-in of 1). In the case of subtraction, $S_n°$ represents the difference of the respective applied pair of operand bits $X_n$ and $Y_n$ assuming the absence of a borrow-in (that is, a borrow-in of 0), while $S_n'$ represents the difference assuming the presence of a borrow-in (that is, a borrow-in of 1). In an analogous manner, the propagate, generate and annihilate outputs $P_n$, $G_n$, and $A_n$ respectively represent carry propagate, carry generate and carry annihilate for addition, while respectively representing borrow propagate, borrow generate and borrow annihilate for subtraction.

The propagate, generate and annihilate outputs $P_n$, $G_n$, and $A_n$ from the first level of logic shown in FIG. 1 will now be considered in further detail in order to permit the remaining description herein to be more readily understood. It will be evident from the logical equations of FIG. 2 that, for addition, the propagate output $P_n$ will be true (that is, a 1) only if $X_n$ and $Y_n$ have values such that a carry-out would be produced by the bit position only if there were a carry-in into the bit position. Accordingly, $P_n$ will be true for addition only if $X_n$ and $Y_n$ are different (that is, if $X_n = 1$ and $Y_n = 0$, or if $X_n = 0$ and $Y_n = 1$). For subtraction, an analogous situation exists in that $P_n$ will be true only if $X_n$ and $Y_n$ have values such that a borrow-out would be produced by the bit position only if there were a borrow-in to the bit position. Accordingly $P_n$ will be true for subtraction only if $X_n$ and $Y_n$ are the same (that is, if $X_n = 0$ and $Y_n = 0$, or if $X_n = 1$ and $Y_n = 1$).

With regard to the generate output $G_n$, it will be evident from the logical equations of FIG. 2 that $G_n$ will only be true if the values of $X_n$ and $Y_n$ are such that there would be a carry-out (in the case of addition) or a borrow-out (in the case of subtraction), regardless of whether or not there is a carry-in or a borrow-in into the bit position. The annihilate output $A_n$, on the other hand, will only be true if there would never be a carry-out (in the case of addition) or a borrow-out (in the case of subtraction), regardless of whether or not there is a carry-in or a borrow-in into the bit position. Consequently, for addition, $G_n$ will be true only if $X_n = Y_n = 1$ and $A_n$ will be true only if $X_n = Y_n = 0$. For subtraction, $G_n$ will be true only if $X_n = 0$ and $Y_n = 1$, and $A_n$ will be true only if $X_n = 1$ and $Y_n = 0$.

By way of example, it is to be understood that each of the 1-bit conditional sum adder and carry decode logic circuits 10–13 in FIG. 1 may be implemented using Fairchild 9838 CTL integrated circuit chips. It is also to be understood that the number of 1-bit conditional sum adder and carry decode logic circuits employed in FIG. 1 may be chosen to accommodate any desired number of digits contained in the input operands X and Y.

At this point in the description, it will be helpful to note that, for simplicity and brevity, the descriptions of the remaining embodiments will primarily be concerned with adder operations. It is to be understood, however, that a subtraction capability may also be included in these embodiments, simply by making appropriate provision therefor in the input level, such as by provision of an ADD/SUBTRACT control line, as illustrated in FIG. 1. Once this is done, there is then no need to make any special provision for subtraction in the following logic levels, since the logic will be the same for both addition and subtraction. Thus, the references to an adder, hereinafter, should be considered as including the capability of providing subtraction as well as addition. Of course, the designations of the various signals will be different depending upon whether addition or subtraction is being performed. Accordingly, for subtraction, the term "borrow" is to be substituted for "carry" and the term "difference" is to be substituted for "sum".

Referring next to FIG. 3, illustrated therein is a 4-bit conditional sum adder in accordance with the invention which employs the 1-bit conditional sum adder and carry decode logic circuits of FIG. 1 as an input level. It will be seen in FIG. 3 that the carry propagate outputs $P_{0-3}$ (that is $P_0, P_1, P_2$ and $P_3$) provided by the FIG. 1 portion are applied to both of carry look-ahead circuits logic 16 and 18, the carry generate outputs $G_{0-3}$ (that is, $G_0, G_1, G_2$ and $G_3$) of FIG. 1 are applied only to carry look-ahead logic circuit 16, and the carry annihilate outputs $A_{0-3}$ (that is, $A_0, A_1, A_2$ and $A_3$) are applied only to carry look-ahead logic circuit 18. These carry look-ahead logic circuits 16 and 18 are preferably identical and may comprise conventional carry look-ahead logic circuitry, such as is commercially available on a Fairchild CTL 9823 integrated circuit chip.

The carry look-ahead logic circuit 16 in FIG. 3 operates in response to an input carry $C_I$ and the applied carry propagate and carry generate signals $P_{0-3}$ and $G_{0-3}$ to produce carry look-ahead signals $C_0$, $C_1$, $C_2$ and $C_3$, one for each bit position of the input operands. The carry look-ahead logic circuit 18, on the other hand, operates in response to the input carry $C_I$ and the applied carry propagate and carry annihilate signals $P_{0-3}$ and $A_{0-3}$ to produce carry-not look-ahead signals $\overline{C}_0$, $\overline{C}_1$, $\overline{C}_2$, and $\overline{C}_3$. The logical equations for these carry and carry-not look-ahead signals are provided in FIG. 3 adjacent their respective output lines from the carry look-ahead logic circuits 16 and 18. These carry and carry-not look-ahead signals are applied to respective ones of AND gates 20-27 in FIG. 3 along with respective ones of the conditional sums $S_{0-3}{}'$ and $S_{0-3}{}^\circ$ for selecting the conditional sums to be used in providing the proper resulting output sums $S_0$, $S_1$, $S_2$ and $S_3$ which properly represent the sum of the input operands $X_{0-3}$ and $Y_{0-3}$.

It is to be noted that, in addition to the economy and high speed made possible by the combination of carry look-ahead and conditional approaches employed in FIG. 3, a further speed advantage is achieved by providing the carry annihilate terms $A_{0-3}$ for application to the carry look-ahead logic circuit 18 along with the carry propagate signals $P_{0-3}$ so that the carry-not look-ahead signals $\overline{C}_0$, $\overline{C}_1$, $\overline{C}_2$ and $\overline{C}_3$ are available simultaneously with the carry look-ahead signals $C_0$, $C_1$, $C_2$ and $C_3$, rather than suffering the time delay which would be necessary if the carry-not look-ahead signals were to be derived by inverting the carry look-ahead signals $C_0$, $C_1$, $C_2$ and $C_3$. It is also to be noted that the logical equations for these carry-not signals $\overline{C}_0$, $\overline{C}_1$, $\overline{C}_2$ and $\overline{C}_3$ illustrated in FIG. 3 identically correspond to those of the carry look-ahead signals $C_0$, $C_1$, $C_2$ and $C_3$, except that the carry annihilate terms $A_0$, $A_1$, $A_2$ and $A_3$ are substituted for respective ones of the carry generate terms $G_0$, $G_1$, $G_2$ and $G_3$, and the inverse carry-in signal $\overline{C}_I$ is substituted for the carry-in signal $C_I$, thereby permitting the same circuits to be used for both of the carry look-ahead logic circuits 16 and 18.

It has thus been illustrated with reference to FIGS. 1-3 how the basic combined conditional and look-ahead approach of the invention may be employed to provide a high speed 4-bit conditional sum adder. It will be apparent to those skilled in the art that the same basic approach illustrated in FIGS. 1-3 can readily be extended to handle any desired number of operand bits by increasing the number of stages in FIG. 1 and by providing the required increased complexity for the carry look-ahead logic circuits 16 and 18 in FIG. 3. However, it will be appreciated that the carry look-ahead circuits will become increasingly complex and expensive as the number of operand bits increases. Accordingly, another important feature of the present invention resides in the manner in which the basic combined conditional and look-ahead approach of the present invention, such as illustrated in connection with FIGS. 1-3, can be economically extended to handle a relatively large number of operand bits. For this purpose, attention is now directed to FIG. 4 which illustrates how a 4-bit conditional sum adder stage may be provided in accordance with the invention for producing two group conditional sums $S_{g0-g3}{}^\circ$ and $S_{g0-g3}{}'$ for the four least significant bits of the input operands along with group carry propagate, generate and annihilate signals $P_{gI}$, $G_{gI}$ and $A_{gI}$. As illustrated in FIG. 5 to be considered hereinafter, these group conditional sums and group carry propagate, generate and annihilate signals produced by the stage of FIG. 4 may be employed along with those produced by a plurality of like stages to form a 16-bit high speed adder.

Now considering FIG. 4 in more detail, it will be seen that, as in FIG. 3, the circuit of FIG. 1 is again used as an input logic level for providing the conditional sums $S_{0-3}{}^\circ$ and $S_{0-3}{}'$ and the carry propagate, generate and annihilate terms $P_{0-3}$, $G_{0-3}$ and $A_{0-3}$ for the four least significant bit positions of the input operands, the higher order bits of the operands being fed to other like stages, as illustrated in FIG. 5. The stages 10-13 of FIG. 1 are thus sub-stages of the 4-bit adder stage of FIG. 4. Four bits have been chosen for application to the 4-bit adder stage of FIG. 4, since such a choice permits use of the same relatively simple and inexpensive type of commercially available integrated circuit chip for the carry look-ahead logic circuits 30-33 in FIG. 4, as may be employed for the carry look-ahead logic circuits 16 and 18 in FIG. 3.

The embodiment of FIG. 4 employs the same basic combination of look-ahead and conditional circuitry used in FIg. 3. However, since two group conditional sums $S_{g0-g3}{}^\circ$ and $S_{g0-g3}{}'$ are to be produced at the output in FIG. 4, one assuming a 0 carry-in and the other assuming a 1 carry-in, rather than the single sum $S_{0-3}$ produced in FIG. 3, the embodiment of FIG. 4 employs two additional carry look-ahead logic circuits for a total of four (indicated by 30-33 in FIG. 4) in order to provide these two group conditional sums. Accordingly, carry look-ahead logic circuits 30 and 31 assume a 0 carry-in is present (that is, $C_I = 0$ and $\overline{C}_I = 1$), while carry look-ahead logic circuits 32 and 33 assume that a 1 carry-in is present (that is, $C_I = 1$ and $\overline{C}_I = 0$). Thus, carry look-ahead logic circuits 30 and 31 in FIG. 4 operate in response to respective ones of the carry propagate, generate and annihilate signals $P_{0-3}$, $G_{0-3}$, and $A_{0-3}$ to produce conditional look-ahead carry and carry-not signals $C_0{}^\circ$, $C_1{}^\circ$, $C_2{}^\circ$, $C_3{}^\circ$ and $\overline{C}_0{}^\circ$, $\overline{C}_1{}^\circ$, $\overline{C}_2{}^\circ$, $\overline{C}_3{}^\circ$ which assume a 0 carry-in, while look-ahead carry logic circuits 32 and 33 operate to produce conditional look-ahead carry and carry-not signals $C_0{}'$, $C_1{}'$, $C_2{}'$, $C_3{}'$, and $\overline{C}_0{}'$, $\overline{C}_1{}'$, $\overline{C}_2{}'$, $\overline{C}_3{}'$ which assume a 1 carry-in. As shown in FIG. 4 these conditional look-ahead carry and carry-not signals are applied to respective ones of AND gates 35-46 along with respective ones of the conditional sums $S_{0-3}{}'$ and $S_{0-3}{}^\circ$ from FIG. 1 to provide the desired two group conditional sums $S_{g0-g3}{}^\circ$ and $S_{g0-g3}{}'$ required for the stage. It will be understood that the logical equations indicated at the outputs of the look-ahead logic circuits 30-33 in FIG. 4 for the look-ahead carry and carry-out signals are simplified as compared to those in FIG. 3 because the values of $C_I$ and $\overline{C}_I$ are assumed to have the fixed values shown. As a result, since the values of $C_0{}^\circ$, $\overline{C}_0{}^\circ$, $\overline{C}_0{}'$ and $\overline{C}_0{}'$ are known, there is no need to provide corresponding AND gates therefor, and they are omitted in FIG. 4.

The remaining signals required to be produced by the stage of FIG. 4 are the group carry propagate, generate and annihilate signals $P_{gI}$, $G_{gI}$ and $A_{gI}$, the applicable logical equations for each being provided in FIG. 4 adjacent its respective output line. It is to be understood that the group carry generate signal $G_{gI}$ and the group annihilate signal $A_{gI}$ can readily be provided, since a Fairchild CTL 9823 logic chip, which as mentioned previously may be employed for each of the circuits 30-33, contains sufficient logic circuitry to additionally provide either $G_{gI}$ or $A_{gI}$ along with the required look-ahead carry output signals. Accordingly, the group generate and group annihilate signals $G_{gI}$ and $A_{gI}$ are illustrated in FIG. 4 as being provided by carry look-ahead logic circuits 30 and 34, respectively. In this regard, it is to be noted that the group carry annihilate signal $A_{gI}$ can readily be provided by the same type of carry look-ahead logic circuit as is used to generate the group carry generate signal $G_{gI}$ since the logical equation for the group carry annihilate signal $A_{gI}$ is the same as that for the group carry generate signal $G_{gI}$ except that the carry annihilate terms $A_0$, $A_1$, $A_2$ and $A_3$ are substituted for respective ones of the carry generate terms $G_0$, $G_1$, $G_2$ and $G_3$. It should thus now be apparent from FIG. 4 how the basic combined look-ahead and conditional approach illustrated in FIG. 3 can be extended to provide a 4-bit conditional sum adder stage. Reference is now made to FIG. 5 which illustrates how the stage of FIG. 4 can be combined with like stages to form a high speed adder capable of handling operands having a relatively large number of bits.

The 16-bit adder of FIG. 5 will be seen to include four 4-bit conditional sum adder stage 50–53, each of which may be constructed and arranged as illustrated in FIG. 4. Stage 50 receives the four least significant bits $X_{0-3}$ and $Y_{0-3}$ of the input operands, stage 51 receives the four next higher bits $X_{4-7}$ and $Y_{4-7}$ of the input operands, stage 52 receives the next higher four bits $X_{8-11}$ and $Y_{8-11}$ of the input operands, and stage 53 receives the four most significant bits $X_{12-15}$ and $Y_{12-15}$ of the input operands. Accordingly, stage 50 provides group conditional sums $S_{g0-g3}{}^0$ and $S_{g0-g3}{}'$ for the first four input operand bits $X_{0-3}$ and $Y_{0-3}$ along with corresponding group propagate, generate and annihilate signals $P_{gI}$, $G_{gI}$ and $A_{gI}$; stage 51 provides group conditional sums $S_{g4-g7}{}^0$ and $S_{g4-g7}{}'$ for the next four input operand bits $X_{4-7}$ and $Y_{4-7}$ along with corresponding group propagate, generate and annihilate signals $P_{gII}$, $G_{gII}$ and $A_{gII}$; stage 52 provides group conditional sums $S_{g8-g11}{}^0$ and $S_{g8-g11}{}'$ for the next four input operand bits $X_{8-11}$ and $Y_{8-11}$ along with corresponding group carry generate, propagate and annihilate signals $P_{gIII}$, $G_{gIII}$ and $A_{gIII}$; and stage 53 provides group conditional sums $S_{g12-15}{}^0$ and $S_{g12-15}{}'$ for the four most significant input operand bits $X_{12-15}$ and $Y_{12-15}$ along with corresponding group carry generate, propagate and annihilate signals $P_{gIV}$, $G_{gIV}$ and $A_{gIV}$. As also illustrated in FIG. 5, and as initially considered in connection with FIG. 1, an ADD-/SUBTRACT control line is included for each stage to permit providing either addition or subtraction operation.

Still with reference to FIG. 5, it will be apparent from a comparison with FIG. 3 that the 4-bit conditional sum adder stages 50–53 are employed in FIG. 5 in place of the 1-bit adders 10–13 of FIG. 1. It will also be apparent that the carry look-ahead logic circuits 52 and 54 in FIG. 5 provide the same logical manipulations on respective ones of the group carry propagate, generate and annihilate signals $P_{gI-gIV}$, $G_{gI-gIV}$ and $A_{gI-gIV}$ for producing the group carry look-ahead signals $C_{g0}$, $C_{g1}$, $C_{g2}$ and $C_{g3}$ and the group carry-not look-ahead signals $\overline{C}_{g0}$, $\overline{C}_{g1}$, $\overline{C}_{g2}$ and $\overline{C}_{g3}$ as do the carry look-ahead logic circuits 16 and 18 in FIG. 3 in producing the carry look-ahead signals $C_0$, $C_1$, $C_2$ and $C_3$ and the carry-not look-ahead signals $\overline{C}_0$, $\overline{C}_1$, $\overline{C}_2$ and $\overline{C}_3$. Thus, the same commercially available Fairchild CTL 9823 chip can be used for each of the carry look-ahead logic circuits 52 and 54 as well as for the circuits 16 and 18 in FIG. 3 and the circuits 30–33 in FIG. 4.

In the same basic manner as in FIG. 3, the resulting group look-ahead carry and group look-ahead carry-not signals $C_{g0}$, $C_{g1}$, $C_{g2}$, $C_{g3}$ and $\overline{C}_{g0}$, $\overline{C}_{g1}$, $\overline{C}_{g2}$ and $\overline{C}_{g3}$ in FIg. 5 are applied to respective groups of AND gates 60–67 along with respective ones of the group conditional sums $S_{g0-g3}{}'$, $S_{g4-g7}{}'$, $S_{g8-g11}{}'$, $S_{g12-g15}{}'$ and $S_{g0-g3}{}^0$, $S_{g4-g7}{}^0$, $S_{g8-g11}{}^0$, $S_{g12-g15}{}^0$ so as to permit appropriate selection of the group conditional sums as required to provide resulting sums $S_{0-3}$, $S_{4-7}$, $S_{8-11}$ and $S_{12-15}$ which will properly represent the sum of the input operands $X_{0-3}$, $Y_{4-7}$, $Y_{8-11}$, $X_{12-15}$ and $Y_{0-3}$, $Y_{4-7}$, $Y_{8-11}$ and $Y_{12-15}$.

It will now be evident from the above consideration of FIG. 5 how the combined look-ahead and conditional approaches in accordance with the invention may be extended to handle relatively large numbers of input operand bits. Although FIG. 5 illustrates the combination of four stages with each stage receiving four bits of the input operands, it will be recognized that the number of stages and/or the operand bits handled per stage may be increased to permit handling operands having larger numbers of bits. For example, 64-bit operands could be handled by employing sixteen 4-bit stages, or by employing four 12-bit stages, or by employing any other combination of stages and bits-per-stage which would permit providing for the handling of 64 operand bits. In other words, the provision of N stages and M-bits per stage in an embodiment designed as illustrated in FIG. 5 will permit handling input operands having M ×N bits. It will also be evident that, because the stages operate independently of one another, the bits-per-stage need not be the same for each stage. Thus, if the bits-per-stage are designated as $M_1$, $M_2$, $M_3$ ... $M_k$, where $k$ is the last stage, the total number of input operand bits which can be handled is $M_1 + M_2 + M_3 + ... M_k$.

As pointed out previously, it is advantageous to employ the combined look-ahead and conditional approach of the invention, not only for the larger adder of FIG. 5, but also for each of the adder stages 50–53 using the adder stage embodiment illustrated in FIG. 4. However, it is to be understood that the adder stages 50–53 in FIG. 5 need not be designed in this manner, in order to take advantage of the FIG. 5 approach. For example, an alternate design for a 4-bit conditional sum adder stage is illustrated in FIG. 6 which is somewhat more economical as regards circuit implementation, but which is not as fast. Considering the FIG. 6 embodiment in more detail, it will be noted that the conditional sums $S_{0-3}{}^0$ and $S_{0-3}{}'$ are not provided in an input logic level along with the carry propagate, generate and annihilate terms $P_{0-3}$, $G_{0-3}$ and $A_{0-3}$ as is done in FIG. 4. Also, the FIG. 6 embodiment does not form conditional look-ahead carry-not signals as is done in FIG. 4 using the annihilate signals $A_{0-3}$ in conjunction with the two additional look-ahead carry logic circuits 31 and 33. Instead, in the FIG. 6 embodiment, the four least significant bits $X_{0-3}$ and $Y_{0-3}$ of the input operands are applied to a conventional form of 4-bit carry decode logic circuit 70 which produces only the carry propagate, generate and annihilate signals $P_{0-3}$, $G_{0-3}$ and $A_{0-3}$, with an ADD/SUBTRACT control also being provided as in FIg. 4 to permit the performance of either addition or subtraction. The carry propagate and generate signals $P_{0-3}$ and $G_{0-3}$ are then applied to two carry look-ahead logic circuits 72 and 74 for generating the conditional carry look-ahead signals $C_0{}^0$, $C_1{}^0$, $C_2{}^0$, $C_3{}^0$ and $C_0{}'$, $C_1{}'$, $C_2'$, $C_3'$ which are in turn applied to respective stages of two conventional 4-bit full adders 82 and 84 along with respective ones of the input operand bits $x_{0-3}$ and $Y_{0-3}$ to thereby provide the group conditional sums $S_{g0-g3}°$ and $S_{g0-g3}'$. In the FIG. 4 embodiment these sums were provided using the selection AND gates 20–27.

As in FIG. 4, the group propagate term $P_{gl}$ in FIG. 6 is derived from the carry propagate signals $P_{0-3}$ using an AND gate 76, while the group generate signal $G_{gl}$ is derived from one of the carry look-ahead logic circuits 74. The group annihilate signal $A_{gl}$ in FIG. 6 is derived from the propagate and annihilate signals $P_{0-3}$ and $A_{0-3}$ using appropriate group annihilate logic 78 to thereby complete the signals required for the adder stage. It will be understood that the carry look-ahead logic circuits 72 and 74 in FIG. 6 may each be implemented using the same previously referred to Fairchild CTL 9823 integrated circuit chip. The group annihilate logic 78 may also be implemented using this same chip, while the 4-bit carry decode logic 70 as well as the 4-bit full adders 82 may be implemented using the same Fairchild CTL 9838 integrated circuit chips used for implementing the stages of FIG. 1.

In addition to the adder stage embodiments illustrated in FIGS. 4 and 6, it will be appreciated that other embodiments are also possible in accordance with the invention for providing the adder stages for use in the embodiment of FIG. 5. For example, the required conditional sums for each stage could be provided by using two separate full adders of any appropriate design, in which case, one adder would assume a carry-in of 0 and the other adder would assume a carry-in of 1. The required group carry propagate, generate and annihilate signals for each stage could then be provided by separate logic using suitable known logical circuitry, such as, for example, is employed in FIG. 6.

Referring next to FIG. 7, illustrated therein is still another advantageous embodiment in accordance with the invention for providing for the handling of large numbers of operand bits. FIG. 7 illustrates how a 16-bit adder stage can be provided which can be combined with three other like 16-bit adder stages, in the same manner as illustrated for the 4-bit stages in FIG. 5, so as to thereby provide a 64-bit adder. In other words, the 4-bit conditional sum adder stage 50–53 of FIG. 5 are now sub-stages of the 16-bit conditional sum adder stage of FIg. 7. A particular advantage of this approach is that the resulting 64-bit adder can be provided using the same relatively simple and inexpensive Fairchild CTL 9823 integrated circuit chip for each carry look-ahead circuit because of the modular approach employed.

More specifically, as illustrated in FIg. 7, it will be seen that the same 4-bit conditional sum adder stages 50–53 employed in the 16-bit adder of FIG. 5 are also used in the embodiment of FIG. 7 for providing the group conditional sums $S_{g0-g15}°$ and $S_{g0-g15}'$ and the group carry propagate, generate and annihilate signals $P_{g1-g1V}$, $G_{g1-g1V}$, and $A_{g1-g1V}$ for the sixteen least significant digits $X_{0-15}$ and $Y_{0-15}$ of a pair of 64-bit input operands. These group conditional sums $S_{g0-g15}°$ and $S_{g0-g15}'$ and the group carry propagate, generate and annihilate signals $P_{g1-g1V}$, $G_{g1-g1V}$ and $A_{g1-g1V}$ are applied to carry look-ahead logic circuits 90–93 in FIG. 7 (which perform the same logical operations thereon as do the like carry look-ahead logic circuits 30–33 in FIG. 4 on the carry propagate, generate and annihilate signals $P_{0-3}$, $G_{0-3}$ and $A_{0-3}$) to provide group conditional look-ahead carry signals $gC_{g0}°$, $gC_{g1}°$, $gC_{g2}°$, $gD_{g3}°$ and $gC_{g0}'$, $gC_{g1}'$, $gC_{g2}'$, $gC_{g3}'$ and group conditional look-ahead carry-not signals $g\overline{C}_{g0}°$, $g\overline{C}_{g1}°$, $g\overline{C}_{g2}°$, $g\overline{C}_{g3}°$, and $g\overline{C}_{g0}'$, $g\overline{C}_{g1}'$, $g\overline{C}_{g2}'$, $g\overline{C}_{g3}'$. As illustrated in FIG. 7, these conditional look-ahead carry and carry-not signals are applied to respective & gate groups 100–111 along with respective ones of the group conditional sums $S_{g0-g15}'$ and $S_{g0-g15}°$ for providing the resulting group conditional sums $gS_{g0-g15}°$ and $gS_{g0-g15}'$ required for the 16-bit adder stage. It will thus be understood that a 64-bit adder can now readily be provided by merely substituting the 16-bit adder stage of FIG. 7 for each 4-bit adder stage of FIG. 5, and by providing sufficient numbers of AND gates in the & gates groups 60–67 in FIG. 5, one for each bit position, so as to thereby provide for selection of the appropriate conditional sums required for the resulting sum of the 64-bit input operands.

It is to be understood that the present invention is not to be considered as limited to the various embodiments of the invention described above, since many variations in construction, arrangement, use and operation are possible without departing from the spirit of the invention. Accordingly, the present invention is to be considered as including all possible modifications and variations coming within the scope of the invention as defined by the appended claims.

What is claimed is:

1. A high speed parallel digital adder for adding two digital operands comprising:

input logic means including a plurality of stages to which said operand digits are applied, each stage receiving a different one or more corresponding pairs of operand digits and being operative in response thereto to produce first and second conditional sum signals for each stage along with corresponding carry output signals for each stage derived solely from the corresponding operand digits applied thereto, said first conditional sum signal being produced assuming the presence of a carry-in to the respective stage and each second condition sum signal being produced assuming the absence of a carry-in to the respective stage;

carry look-ahead logic means responsive to said carry output signals for producing stage look-ahead carry and carry-not signals; and selection means to which said stage look-ahead carry and carry-not signals are applied along with said first and second conditional sums for selecting particular ones of said conditional sums representing the sum of said operands.

2. The invention in accordance with claim 1, wherein said input logic means is responsive to an applied control signal for producing borrow output signals for said stages.

3. The invention in accordance with claim 1:

wherein said carry output signals produced for each stage comprise a carry propagate signal, a carry generate signal and a carry annihilate signal; and wherein said carry look-ahead logic means comprises a first carry look-ahead logic circuit responsive to said carry propagate and carry generate signals for producing said carry look-ahead signals, and a second carry look-ahead logic circuit providing the same logical manipulations as said first carry look-ahead logic circuit and responsive to said carry propagate and carry annihilate signals for producing said look-ahead carry-not signals.

4. The invention in accordance with claim 1:

wherein each stage receives a single pair of corresponding digits of said operands;
wherein said carry output signals produced for each stage comprise a carry propagate signal, a carry generate signal and a carry annihilate signal; and
wherein said carry look-ahead logic means comprises a first carry look-ahead logic means responsive to said carry propagate and carry generate signals for producing said carry look-ahead signals, and a second carry look-ahead logic means responsive to said carry propagate and carry annihilate signals for producing said look-ahead carry--not signals.

5. The invention in accordance with claim 4, wherein said first carry look-ahead logic means is additionally responsive to a carry-in signal provided along with said operands, while said second carry look-ahead logic means is additionally responsive to the inverse of said carry-in signal.

6. The invention in accordance with claim 1, wherein each stage receives a predetermined plurality of different pairs of consecutive corresponding digits of said operands, and wherein each stage comprises:
a plurality of sub-stages, each sub-stage receiving a different one or more correspnding pairs of the operand digits applied to the stage for producing first and second conditional sum signals for each sub-stage assuming the presence and absence, respectively, of a carry-in to the sub-stage, and for also producing sub-stage carry output signals, the conditional sum signals and carry output signals produced for each sub-stage being derived solely from the respective operand digits applied thereto;
carry look-ahead logic means for each stage responsive to the carry output signals produced by the sub-stages for producing first and second sub-stage look-ahead carry and carry-not signals assuming the presence and absence, respectively, of a carry-in to the stage;
selection means for each stage which said first and second look-ahead carry and carry-not signals are applied along with said conditional sum signals from said sub-stages for providing a first conditional sum signal for the stage representative of the sum of the operand digits applied to the stage assuming the presence of a carry-in to the stage and a second conditional sum signal for the stage representative of the sum of the applied operand digits assuming the absence of a carry-in to the stage; and
additional logic means for each stage for generating carry output signals for the stage derived solely from the operand digits applied to the stage.

7. The invention in accordance with claim 6, wherein said sub-stages are responsive to an applied control signal for producing borrow output signals.

8. The invention in accordance with claim 6:
wherein said carry output signals produced for each stage comprise a stage carry propagate signal, a stage carry generate signal and a stage carry annihilate signal;
wherein said carry output signals produced for each sub-stage comprise a sub-stage carry generate signal, a sub-stage carry propagate signal, and a sub-stage carry annihilate signal;
wherein said carry look-ahead logic means responsive to said stage carry output signals comprises a first carry look-ahead logic circuit responsive to said stage carry propagate and generate signals for producing said stage carry look-ahead signals and a second carry logic circuit responsive to said stage carry propagate and annihilate signals for producing said stage carry-not look-ahead signals; and
wherein said carry look-ahead logic means responsive to said sub-stage carry output signals comprises third, fourth, fifth and sixth carry look-ahead logic circuits, said third and fourth carry look-ahead logic circuits being responsive to said sub-stage carry propagate and generate signals and assuming the presence and absence, respectively, of a carry-in to the stage for producing said first and second sub-stage look-ahead carry signals, and said fifth and sixth carry look-ahead logic circuits being responsive to said sub-stage carry propagate and annihilate signals and assuming the presence and absence, respectively, of a carry-in to the stage for producing said first and second sub-stage look-ahead carry-not signals.

9. The invention in accordance with claim 8, wherein said first carry look-ahead logic circuit is additionally responsive to a carry-in signal provided along with said operands while said second carry look-ahead logic circuit is additionally responsive to the inverse of said carry-in signal.

10. The invention in accordance with claim 9 wherein all of said carry look-ahead logic circuits employ the same logical circuitry.

11. The invention in accordance with claim 1, wherein each stage receives a predetermined plurality of different pairs of consecutive corresponding digits of said operands, wherein said conditional sum signals for each stage comprise a first group conditional sum signal which assumes the presence of a carry-in to the stage and a second group conditional sum signal which assumes the absence of a carry-in to the stage, wherein said carry information output signals produced for each stage comprise a group carry propagate signal, a group carry generate signal and a group carry annihilate signal, and wherein said carry look-ahead logic means comprises first carry look-ahead logic means responsive to said group carry propagate and group carry generate signals for producing said look-ahead carry signals and a second carry look-ahead logic means responsive to said group carry propagate and said group carry annihilate signals for producing said look-ahead carry-not signals.

12. The invention in accordance with claim 11, wherein said first carry look-ahead logic means is additionally responsive to a carry-in signal provided along with said operands, while said second carry look-ahead logic means is additionally responsive to the inverse of said carry-in signal.

13. The invention in accordance with claim 11, wherein each stage comprises:
a plurality of sub-stages, each sub-stage receiving a different one or more corresponding pairs of the operand digits applied to the stage for producing first and second conditional sum signals for each sub-stage assuming the presence and absence, respectively, of a carry-in to the sub-stage, and also for producing sub-stage carry propagate, generate, and annihilate signals, the conditional sum signals and carry signals produced for each sub-stage being derived solely from the respective operand digits applied thereto;
first, second, third and fourth carry look-ahead logic means for each stage responsive to predetermined ones of said sub-stage carry signals for producing first and second sub-stage look-ahead carry and carry-not signals assuming the presence and absence, respectively, of a carry-in to the stage;

selection means for each stage to which said first and second look-ahead carry and carry-not signals are applied along with said conditional sum signals from said sub-stages for providing said first group conditional sum signal for each stage representative of the sum of the operand digits applied to the stage assuming the presence of a carry-in to the stage and said second group conditional sum signal for each stage representative of the sum of the applied operand digits assuming the absence of a carry-in to the stage; and additional logic means for each stage for generating said group carry propagate, generate and annihilate signals for the stage derived solely from the operand digits applied to the stage.

14. The invention in accordance with claim 11, wherein each stage comprises:

carry decode logic means responsive solely to the operand digits applied thereto for producing sub-stage carry propagate and generate signals;

first carry look-ahead logic means responsive to said sub-stage carry propagate and generate signals for producing first look-ahead carry-in signals which assume the presence of a carry-in to the stage;

second carry look-ahead logic means responsive to said sub-stage carry propagate and generate signals for producing second look-ahead carry-in signals which assume the absence of a carry-in to the stage;

a first full adder for each stage responsive to said first look-ahead carry-in signals and the operand digits applied to the stage for producing said first group conditional sum;

a second full adder, for each stage responsive to said second look-ahead carry-in signals and the operand digits applied to the stage for producing said second group conditional sum; and additional logic for each stage for generating said group carry propagate, generate and annihilate signals for the stage derived solely from the operand digits applied to the stage.

15. An adder stage for use in a high speed adder, said stage receiving a predetermined plurality of different pairs of consecutive corresponding digits of a pair of operands, said stage comprising:

a plurality of sub-stages, each sub-stage receiving a different one or more correspnding pairs of the operand digits applied to the stage for producing first and second conditional sum signals for each sub-stage assuming the presence and absence, respectively, of a carry-in to the sub-stage, and for also producing sub-stage carry output signals, the conditional sum signals and carry output signals produced for each sub-stage being derived solely from the respective operand digits applied thereto;

carry look-ahead logic means responsive to the carry output signals produced by the sub-stages for producing first and second sub-stage look-ahead carry and carry-not signals assuming the presence and absence, respectively, of a carry-in to the stage;

selection means to which said first and second look-ahead carry and carry-not signals are applied along with said conditional sum signals from said sub-stages for providing a first conditional sum signal for the stage representative of the sum of the operand digits applied to the stage assuming the presence of a carry-in to the stage and a second conditional sum signal for the stage representative of the sum of the applied operand digits assuming the absence of a carry-in to the stage; and additional logic means for generating carry output signals for the stage derived solely from the operand digits applied to the stage.

16. The invention in accordance with claim 15:

wherein said sub-stage carry output signals comprise a sub-stage carry generate signal, a sub-stage carry propagate signal, and a sub-stage carry annihilate signal; and wherein said carry look-ahead logic means responsive to said sub-stage carry output signals comprises third, fourth, fifth and sixth carry look-ahead logic circuits, said third and fourth carry look-ahead logic circuits being responsive to said sub-stage carry propagate and generate signals and assuming the presence and absence, respectively, of a carry-in to the stage for producing said first and second sub-stage look-ahead carry signals, and said fifth and sixth carry look-ahead logic circuits being responsive to said sub-stage carry propagate and annihilate signals and assuming the presence and absence, respectively, of a carry-in to the stage for producing said first and second sub-stage look-ahead carry-not signals.

17. A method of adding two digital operands which method is performed automatically in a data processing system and comprises the steps of:

electronically generating first and second conditional sum signals along with corresponding carry output signals for each of a different one or more corresponding pairs of operand digits based solely on the particular operand digits applied thereto, each first conditional sum being generated assuming the presence of a carry-in and each second conditional sum being generated assuming the absence of a carry-in:

electronically combining said carry output signals for producing look-ahead carry and carry-not signals; and electronically selecting particular ones of said first and second conditional sum signals in response to said look-ahead carry and carry-out signals so as to provide resulting sum signals properly representing the sum of said operands.

18. The invention in accordance with claim 17:

wherein said carry output signals generated for each of said different one or more corresponding pairs of operand digits comprise a carry propagate signals, a carry generate signal and a carry annihilate signal; and wherein the step of electronically combining comprises generating said look-ahead carry signals in response to said carry propagate and generate signals, and generating said look-ahead carry-not signals in response to said carry propagate and carry annihilate signals.

* * * * *

UNITED STATES PATENT AND TRADEMARK OFFICE
CERTIFICATE OF CORRECTION

PATENT NO. : 3,993,891
DATED : November 23, 1976
INVENTOR(S) : Gary R. Beck and Ronald C. Quave It is certified that error appears in the above-identified patent and that said Letters Patent are hereby corrected as shown below:

Col. 1, line 23, change "employes" to --employs--.
Col. 6, line 24, change "FIg" to --FIG--.

Col. 7, line 5, change "30 and 34" to --30-33--.
line 23, change "stage" to --stages--.
Col. 8, line 6, change "FIg" to --FIG--.
line 13, change "$Y_{4-7}$", first occurrence, to --$X_{4-7}$--.
change "$Y_{8-11}$", first occurrence, to --$X_{8-11}$--.
line 64, change "FIg" to --FIG--.
Col. 9, line 3, change "$x_{0-3}$" to --$X_{0-3}$--.
line 45, change "stage" to --stages--.
line 47, change "FIg" to --FIG--.
Col. 10, line 40, change "condition" to --conditional--.
Col. 11, line 39, between "stage" and "which" insert --to--.
Col. 14, line 8, delete "additional" and insert on next line before "logic".
line 57, change "nals" to --nal--.

Signed and Sealed this

Twenty-second Day of March 1977

[SEAL]

Attest:

RUTH C. MASON
Attesting Officer

C. MARSHALL DANN
Commissioner of Patents and Trademarks